Jan. 29, 1974  SEINOSUKE NAKAZAWA  3,788,933
APPARATUS FOR HEAT SEALING THE OVERLAPPING END PORTIONS OF
AN ELONGATED THERMOPLASTIC STRAPPING BAND
Filed Sept. 23, 1971  4 Sheets-Sheet 1

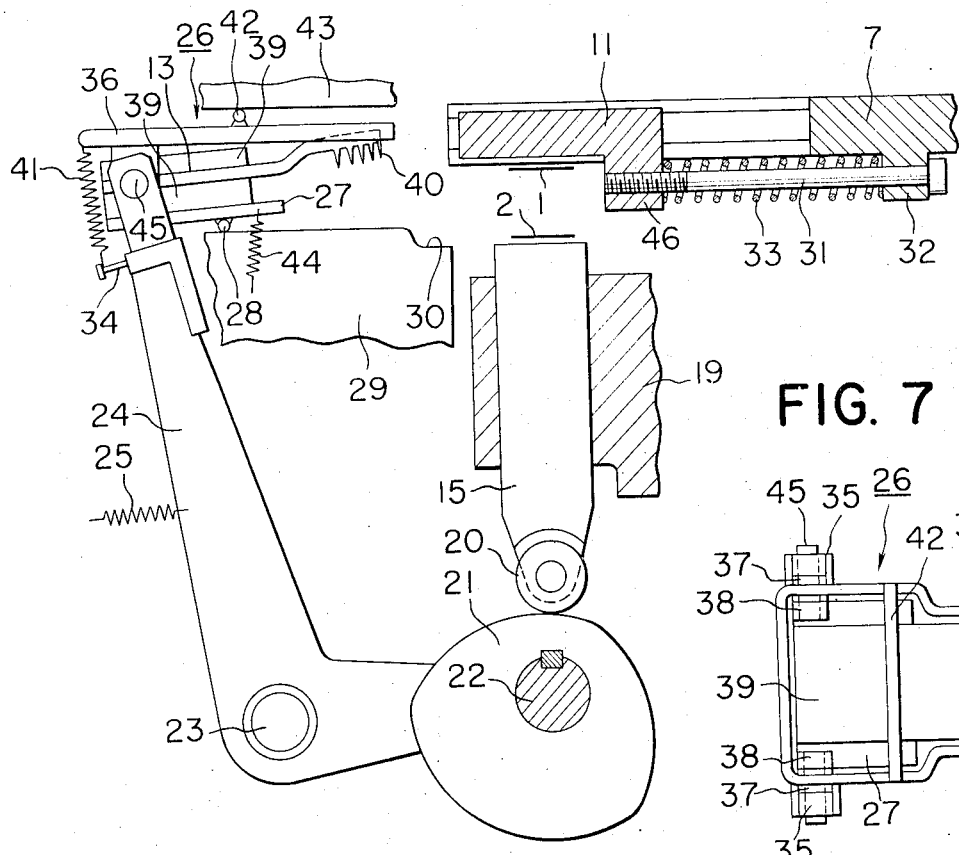
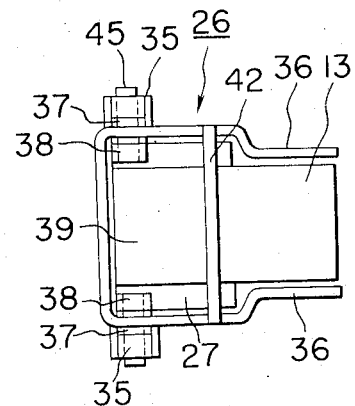
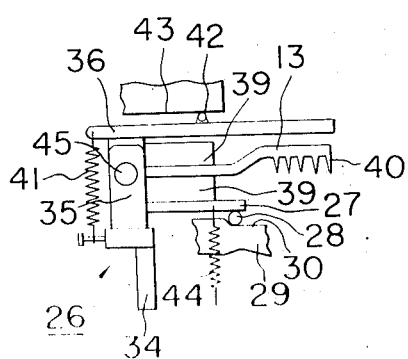
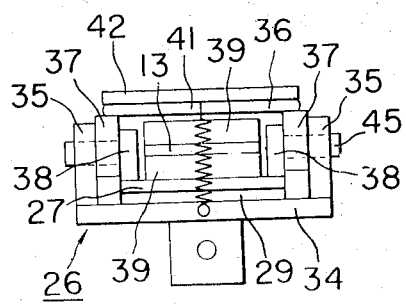

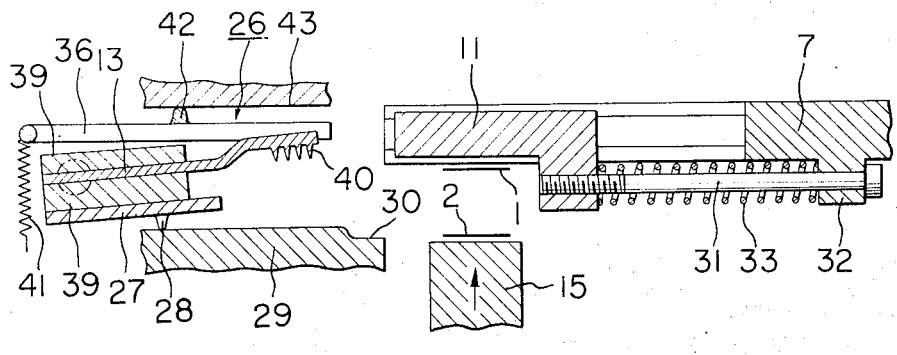
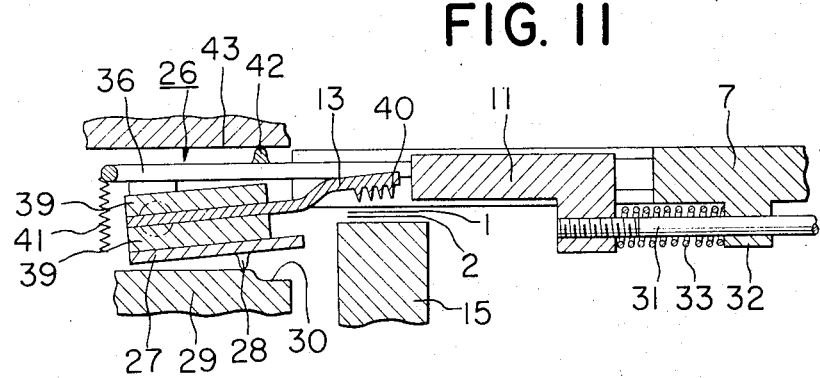
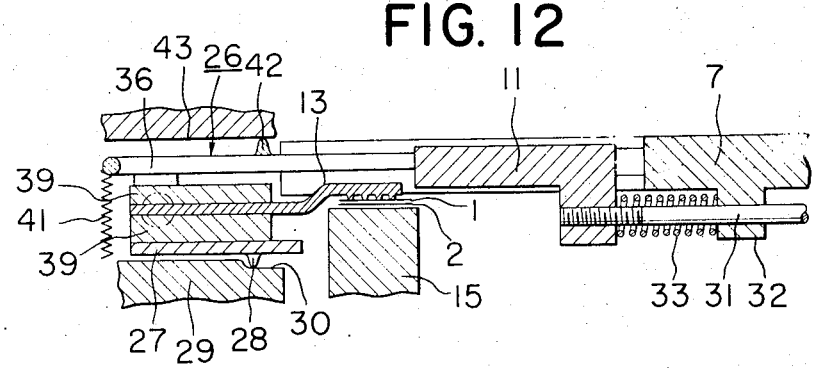

United States Patent Office 3,788,933
Patented Jan. 29, 1974

3,788,933
APPPARATUS FOR HEAT SEALING THE OVER-
LAPPING END PORTIONS OF AN ELONGATED
THERMOPLASTIC STRAPPING BAND
Seinosuke Nakazawa, Kenagawa, Japan, assignor to
Ikegai Tekko Kabushiki Kaisha, Tokyo, Japan
Filed Sept. 23, 1971, Ser. No. 183,022
Claims priority, application Japan, Sept. 28, 1970,
45/84,881
Int. Cl. B32b 31/18, 31/20; B29c 27/00
U.S. Cl. 156—513       4 Claims

ABSTRACT OF THE DISCLOSURE

A welding apparatus applicable to a packing machine for use in strapping packages with a thermoplastic band, which comprises a movable heat plate provided with plural blades disposed parallel to the direction of strain of the band, which plate is moved against the overlapped portion of the plastic bands to be welded, thereby melting said plastic bands by the portion surrounding said blades as they penetrate one of the overlapping bands and eat into the other one, and means for pressing the overlapped portions thus partially melted together to thereby join said bands.

BACKGROUND OF THE INVENTION (a) Field of the invention

The present invention relates to an apparatus for welding applicable to a packing machine for use in strapping a package by employing a strapping band made of a thermoplastic material such as polypropylene, which comprises welding the both ends of said band while being in the state of tight binding.

(b) Description of the prior art

As for the conventional apparatus of this kind, such an apparatus is diagrammatically shown in FIGS. 1 and 2 of the drawings, and comprises a multiplicity of heated pinlike heat members (not shown in said drawings) which are pushed against the overlap portion of the both ends $a$ and $b$ of a thermoplastic band, which heat members perforate the band and form the holes $c$ surrounded by the melted part $d$.

However, a band thus welded has been defective in that, when the tensile force works on the ends $a$ and $b$ of said band, its stress converges upon the welding portion surrounding the holes $c'$ and $c''$ located at the both ends of the group of holes $c$ while the stress on the other welding portion decreases, resulting in an insufficient tensile strength of the welded band.

SUMMARY OF THE INVENTION

One object of the present invention is to provide an apparatus for welding a strapping band, which can eliminate the foregoing defects accompanying the conventional apparatus and apportion the burdens of tensile force practically uniformly to a wide range of the welding portion, and thereby remarkably enhance the strength of the welding portion.

Another object of the present invention is to provide an apparatus which results in a method of welding a strapping band comprising the steps of thrusting the blades of a heat plate disposed parallel to the direction of strain of the strapping plastic band through the overlap portion of said band to thereby melt it partially and welding the band by the thus melted portion by applying pressure, wherein the melted portion is formed parallel to the direction of strain of the band, the tensile force working on the band is apportioned to all parts of the welding portion practically uniformly and the strength of the welding portion of the band is enhanced.

A further object of the present invention is to provide an apparatus for welding a strapping band, wherein the blades of the heat plate penetrate one of the overlapping plastic bands but do not penetrate the other one, so that there is no fear of causing the plastic to adhere to the surface of the press member, a long spell of stable welding operation can be expected, a further enhancement of the strength of the welding portion of the band is possible, and said strength can be decided through the thin film portion left without being melted.

BRIEF DESCRIPTION OF THE DRAWINGS

Of the appended drawings.

FIG. 6 is a schematic representation of fragmental sectional view taken along the line VI—VI in FIG. 5.

FIG. 7 is a schematic representation of plan view of the heating mechanism in FIG. 6.

FIG. 8 is a schematic representation of front view of the same heating mechanism as in FIG. 7.

FIG. 9 is a schematic representation of side-view of the same heating mechanism as in FIG. 7.

FIGS. 10–14 are illustrations to explain the order of movements of the heat plate in relation to the band.

DETAILED DESCRIPTION OF THE INVENTION

Figure 1:
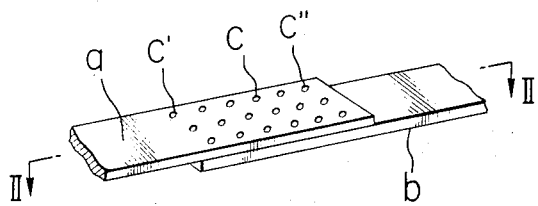
FIG. 1 is a schematic representation of perspective view of the welding portion of a band welded by the conventional welding apparatus.
Figure 2:
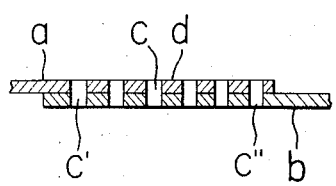
FIG. 2 is a schematic representation of sectional view taken along the line II—II in FIG. 1.
Figure 3:
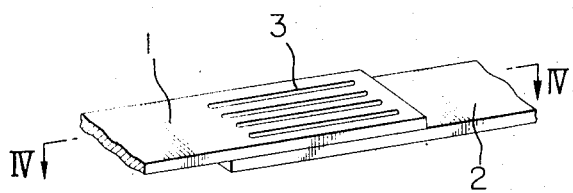
FIG. 3 is a schematic representation of perspective view of the welding portion of a band welded by the welding apparatus according to the present invention.
Figure 4:
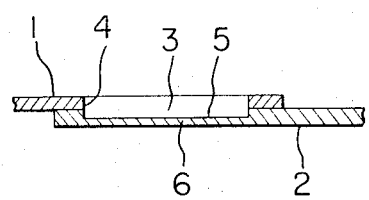
FIG. 4 is a schematic representation of sectional view taken along the line IV—IV in FIG. 3.

FIGS. 3 and 4 show a portion of the band welded by the apparatus of the present invention, and the numeral references 1 and 2 respectively denote the overlapped portions of the band, 3 denotes the elongated grooves formed parallel to the direction of strain of the band as a result of its melting effected by the heating plate, 4 denotes the welded portion surrounding each of said grooves, 5 denotes the bottom portion of the groove as indented on the underlying band 2, and 6 denotes the unpenetrated thin film portion of the underlying band 2.

Figure 5:
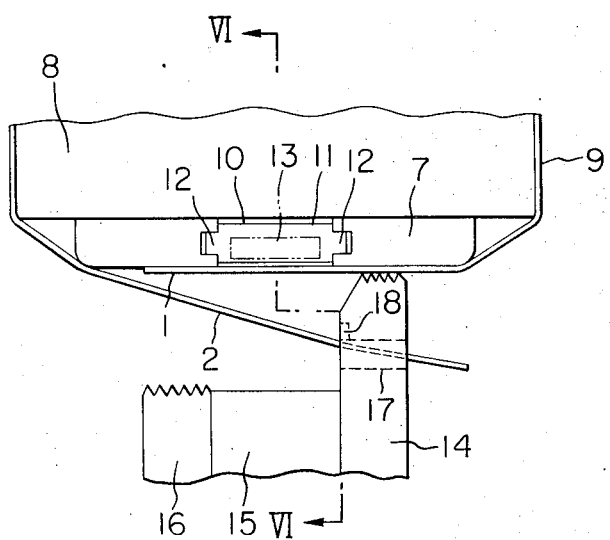
FIG. 5 is a schematic representation of a front view of an apparatus according to the present invention.

In FIG. 5, the numeral reference 7 denotes the table to put the package 8 thereon, and there is provided the grooved portion 10 at a right angle to the direction of strain of the band 9 about the center of said table. The slide plate 11 is fitted into this grooved portion 10, and the projections 12 provided on the both side-walls of said slide plate 11 are fitted in slidable fashion into the guide groove provided on the both side-walls of the grooved portion 10. 13 shown by a dotted line denotes the heat plate which end faces the slide plate 11 (cf. FIG. 6). 14 and 16 denote the vertically movable holding members to hold the bands 1 and 2 between the table 7 and said holding members by pressing said bands against the table by the both sides of the grooved portion 10, and are provided with teeth on their top portions. 15 denotes the vertically movable press member disposed between said holding members 14 and 16. The holding member 14 is provided with the hole 17 to run the band 2 therethrough, and the cutter 18 is provided on the upper part of the inside of said hole.

In FIG. 6, the press member 15 is fitted into the guide groove cut in the supporting frame 19, and its lower end is mounted with the roller 20. This roller 20 is engaged with the cam 21 fixed on the shaft 22 pivoted on the frame not shown herein. This shaft 22 is so devised as to rotate by means of the driving gear not shown herein. The holding members 14 and 16 are of the same mechanism as that of the press member 15 so that their illustration may be dispensed with. On the shaft 23 fixed on the frame of the apparatus is pivoted the base of the bell crank 24 whose lower arm is provided with a roller (not shown herein) on its end, and this roller is engaged with a cam (not shown herein) fixed on the shaft 22, while the spring 25, whose one end is fixed on the frame of apparatus, is fixed on an appropriate place of the upper arm of the bell crank 24 by the other end thereof so as to pull the bell crank 24 constantly in the direction of the left side of FIG. 6. On the supporting member 34 fixed on the end of the upper arm of the bell crank 24, is pivoted the heating mechanism 26, which details are shown in FIGS. 7–9, by means of the pin 45. Beneath the base plate 27 of this heating mechanism 26, there is provided the projection 28, and, by virtue of the spring 44 installed between the main body and the base plate 27, said projection 28 is made to contact constantly with the surface of the stepped guide member 29 fixed on the frame of apparatus. The surface of the stepped guide member 29 is provided with the lower step 30. Above the push bar 36 pivoted on the upper part of the heating mechanism 26, there is provided the transverse bar 42, and between one end of said push bar 36 and the supporting member 34, there is installed the spring 41 so as to make the transverse bar 42 contact constantly with the surface of the guide member 43 fixed on the frame of apparatus. Into the supporting portion 46 of the rear end of the slide plate 11 is screwed the end of the guide rod 31 which penetrates the supporting portion 32, that is, the lower part of the table 7. This guide rod 31 is provided with the spring 33 which coils round its portion between the supporting portions 32 and 46, so that the slide plate 11 is kept away from the table 7 and its end nears the end of the push bar 36, whereby its front bottom comes to be positioned above the press member 15.

FIGS. 7–9 show the details of the heating mechanism 26, wherein the supporting lug 37 of the frame-shaped push bar 36 and the supporting lug 38 of the base plate 27 are pivoted in a row by means of the pin 45 on the brackets 35 provided on the both sides of the supporting member 34, the heat plate 13 equipped with the upper end lower heaters 39 is fixed on the base plate 27, and several blades 40 having an appropriate length are formed, parallel to the direction of strain of the band 9 on the fore part of the heat plate 13.

Operation

As shown in FIG. 5, the band 9 is fed through the hole 17 of the holding member 14 by means of the conventional feed mechanism as well as induction mechanism not shown herein to surround the package 8 placed on the table 7, and, when the tip 1 of said band has passed under the grooved portion 10 along the bottom of the table 7, the holding member 14 is elevated by means of a cam (not shown herein) fixed on the rotary shaft 22, whereby the tip 1 of the band is sandwiched in between the top of the holding member 14 and the bottom of the table 7 and pressed thereby.

Subsequently, the holding member 16 is elevated in the same way as the foregoing holding member 14 to push up a portion of the band 9 extending from the left hand bottom corner of the table to the edge of the cutter 18 in a downward but slanting direction, as seen in FIG. 5, with a tension, whereby said portion 2 of the band 9 gets sandwiched in between the top surface of the holding member 16 and the bottom of the table 7 so that it is brought into a position to extend horizontally through a narrow space between the top surface of the holding member 16 and the bottom of the table 7 and then from the end of sandwiched portion thereof toward the edge of the cutter 18 in a more slanting direction than before.

At this moment, the press member 15 engaged with the cam 21 through the roller 20 is elevated as said cam 21 rotates by virtue of the rotation of the shaft 22, whereby the band 9 is cut by the top of the press member 15 and the cutter 18 and the cut end of the band 9 slides up along the side-wall of the press member 14. On the occasion, by means of a cam (not shown herein) fixed on the shaft 22, the lower arm of the bell crank 24 is pushed down to thereby turn the upper arm thereof clockwise in opposition to the tension of the spring 25 in FIG. 6, and, as a result, the heating mechanism 26 pivoted on the supporting member 34 starts moving forwards while making the transverse bar 42 and the projection 28 slide on the guide member 43 of the table 7 and the surface of the upper step of the stepped guide member 29. At this juncture, the fore bottom of the slide plate 11 pushed by the spring 33 is located above the press member 15, and the head of the guide rod 31 is engaged with the supporting portion 32 of the table 7 and rests in that condition (see FIG. 10).

With further advance of the heating mechanism 26, the push bar 36 constituting a part of said mechanism strikes the front of the slide plate 11 confronting it and makes the slide plate 11 move back in opposition to the push by the spring 33, whereby the heat plate 13 is brought to a position above the overlapped portions of the bands 1 and 2 placed on the press member 15 (see FIG. 11).

When the heating mechanism 26 advances a little more subsequent thereto (see FIG. 12), the projection 28 provided on the bottom of the base plate 27—which plate is always being pulled downwards by the spring 44—slides down onto the lower step 30 of the guide member 29 to swing the base plate 27 downwards centering around the pivot 45 and, as a result, the heat plate 13 descends and the blades 40 thereof are thrusted into the overlapping band portions 1 and 2 to penetrate the upper band portion 1 and to partially penetrate the lower band portion 2, whereby the heated blades 40 cause melting together of the portions of the bands 1 and 2 surrounding the blades.

At this, the bell crank 24 turns anticlockwise, and, as a result, the heating mechanism 26 starts moving back, the projection 28 slides up to the upper step from the lower step 30 of the guide member 29 at the time of this movement, whereby the heat plate 13 ascends to pull out the blades 40 from the bands 1 and 2, and, at the same time, the slide plate 11 advances due to the retreat of the push bar 36 and the push by the spring 33. When the bottom surface of the slide plate 11 has come to cover the upper surface of the overlap portion of the bands 1 and 2, the head of the guide rod 31 is engaged with the supporting portion 32 of the table 7 and stops. Meanwhile, the heating mechanism 26 keeps moving back until it returns to its initial position and stops there (see FIG. 13).

Figure 13:
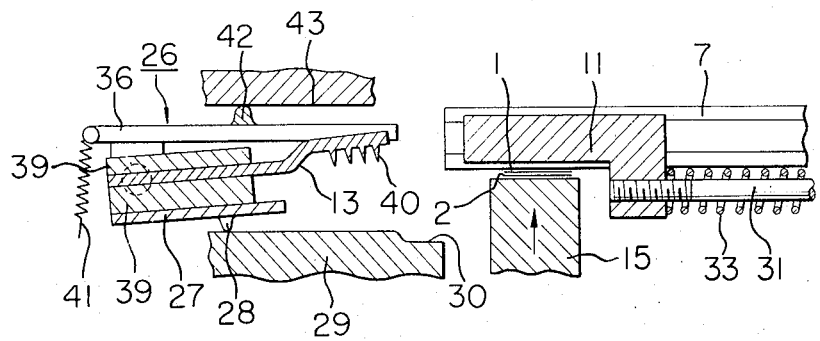
Figure 14:
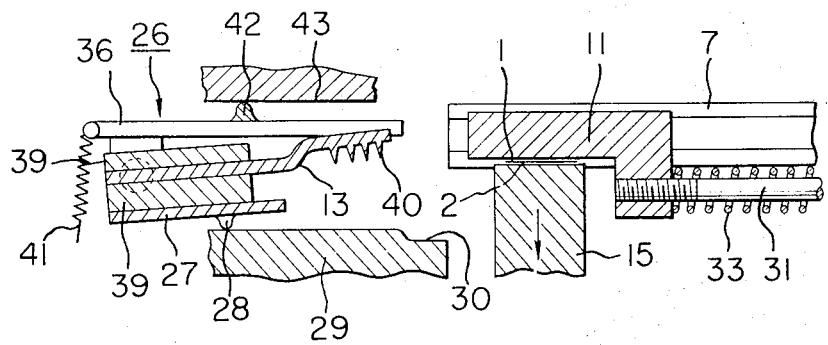
Figure 15:
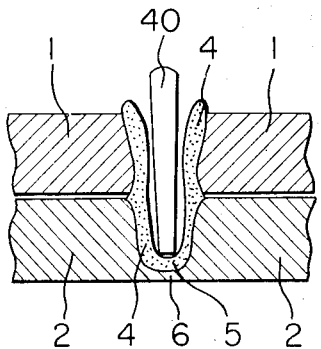
FIG. 15 is a diagrammatic sectional view, on an enlarged scale, of the melted portion of the band on the occasion of melting.
Figure 16:
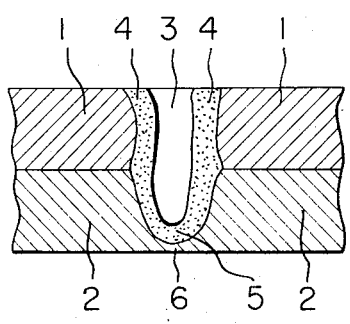
FIG. 16 is a diagrammatic sectional view, on an enlarged scale, of the welding portion of the band afetr welding.

In the conditions shown in FIGS. 11, 12 and 13, the press member 15 resting in the position as illustrated is next pushed up to some extent to press the bands 1 and 2 between its upper surface and the bottom surface of the slide plate 11 while preventing the direct contact of the molten plastic with the upper surface of the press member 15 due to the thin layer 6 (FIG. 4) which is not penetrated by the blades 40. As a result of this pressing, the melted portions 4 and 5, which are somewhat separated due to the interstice between the bands 1 and 2 (see FIG. 15), get uniformly welded, and the bands 1 and 2 stick fast to each other (see FIG. 16).

Although particular preferred embodiments of the invention have been disclosed hereinabove for purposes of illustration, it will be understood that variations or modifications thereof which lie within the scope of the invention as defined by the appended claims are fully contemplated.

What is claimed is:

1. An apparatus for heat sealing the overlapping end portions of an elongated thermoplastic strapping band, such as for securing said band in surrounding relationship to a package, comprising:

sealing means for sealing said overlapping end portions together, said sealing means including a plurality of elongated and substantially parallel platelike heated blades disposed in side-by-side relation, said blades being disposed with the elongated direction thereof substantially parallel to the elongated direction of said end portions;

means for causing said heated blades to completely penetrate one of said end portions and only partially penetrate the other end portion; and means for pressing the heat-sealed overlapping end portions together to obtain a firm joining thereof.

2. An apparatus according to claim 1, wherein said sealing means includes a movable sealing member having said heated blades mounted thereon, and means coacting with said sealing member for moving same in a first direction which is substantially transverse to the longitudinal direction of said end portions from a first position wherein said blades are spaced from said end portions to a second position wherein said blades engage said one end portion, and said means for pressing said end portions together including a pressing member and means coacting with same for moving said pressing member in a direction substantially parallel to said first direction from a first position wherein said pressing member is spaced from said end portions to a second position wherein said pressing member engages said other end portion, said sealing member and said pressing member being disposed in engagement with the opposite sides of said overlapping end portions when in their respective second positions.

3. An apparatus according to claim 2, further including means coacting with said sealing member for moving same in a second direction which is substantially transverse to both said first direction and the longitudinally extending direction of said end portions for permitting the sealing member to be positioned laterally spaced from said strapping band.

4. An apparatus according to claim 3, further including table means for permitting a package to be positioned thereon and for enabling the strapping band to be wrapped around the package and around a portion of the table means, the table means including a stationary table portion and a movable table portion mounted on the stationary table portion for movement relative thereto, said movable table portion being normally disposed directly opposite said pressing member for permitting the overlapping end portions to be disposed therebetween, and means coacting with said movable table portion for moving same laterally away from said overlapping end portions for permitting said sealing member to be moved along said second direction and disposed directly adjacent said overlapping end portions so as to be disposed opposite said pressing member.

References Cited

UNITED STATES PATENTS

| | | | |
|---|---|---|---|
| 3,513,052 | 5/1970 | Ariyasu et al. | 156—251 |
| 3,509,990 | 5/1970 | Piazze | 161—111 X |
| 3,241,588 | 3/1966 | Osher et al. | 156—251 X |
| 3,012,918 | 12/1961 | Schaar | 161—112 |
| 3,013,930 | 12/1961 | Serbin | 156—581 |
| 3,484,855 | 12/1969 | Young et al. | 156—513 |
| 3,518,147 | 6/1970 | Harmsen | 156—513 X |

PHILIP DIER, Primary Examiner

U.S. Cl. X.R.

156—581, 157, 253, 304